United States Patent
Martini

(10) Patent No.: US 6,773,054 B2
(45) Date of Patent: Aug. 10, 2004

(54) OPEN MESH REMOVABLE VEHICLE DOOR

(76) Inventor: William Martini, 627 Ridgewood Dr., Windermere, FL (US) 34786

( * ) Notice: Subject to any disclaimer, the term of this patent is extended or adjusted under 35 U.S.C. 154(b) by 0 days.

(21) Appl. No.: 10/671,093

(22) Filed: Sep. 25, 2003

(65) Prior Publication Data

US 2004/0061356 A1 Apr. 1, 2004

Related U.S. Application Data

(60) Provisional application No. 60/413,525, filed on Sep. 25, 2002.

(51) Int. Cl.[7] .................................................. B60J 5/04
(52) U.S. Cl. ........................................ 296/148; 296/149
(58) Field of Search .............................. 296/146.1, 148, 296/149, 152, 153, 146.14, 107.09, 107.16

(56) References Cited

U.S. PATENT DOCUMENTS

| | | | | |
|---|---|---|---|---|
| 2,460,399 A | * | 2/1949 | Schassberger | 296/148 |
| 4,070,056 A | * | 1/1978 | Hickman | 296/148 |
| 4,215,895 A | * | 8/1980 | Phillips | 296/202 |
| 5,009,458 A | * | 4/1991 | Shute | 296/152 |
| 5,290,086 A | * | 3/1994 | Tucker | 296/152 |
| 5,788,317 A | * | 8/1998 | Nation | 296/141 |
| 5,806,906 A | * | 9/1998 | Hammond | 296/26.01 |
| 6,135,497 A | * | 10/2000 | Sutherland et al. | 296/152 |
| 6,338,522 B1 | * | 1/2002 | LeBlanc | 296/107.09 |
| 6,505,880 B1 | * | 1/2003 | Castro | 296/102 |

OTHER PUBLICATIONS

"Tank Tops and Jerzy Tops for Jeeps", http://rockgearinc.com, printed from the internet Feb. 22, 2004.*

Pagan, Shawn, "Raingler Web Nets", http://www.rockcrawler.com, printed from the internet Feb. 22, 2004.*

* cited by examiner

Primary Examiner—Jason Morrow
(74) Attorney, Agent, or Firm—Allen, Dyer, Doppelt, Milbrath & Gilchrist, P.A.

(57) ABSTRACT

An open mesh vehicle door comprising a substantially rigid frame member, having at least one pin to pivotally affix said door to a vehicle at a first end and having a latch at a second end, further having an open mesh webbing being attached between at least two opposing sides of the frame member.

21 Claims, 3 Drawing Sheets

OPEN MESH REMOVABLE VEHICLE DOOR

CROSS REFERENCE TO A RELATED APPLICATION

This application claims the benefit of U.S. Provisional Application Ser. No. 60/413,525 filed Sep. 25, 2002.

FIELD OF THE INVENTION

The subject invention pertains to the field of automobile doors, more particularly to removable sport utility vehicle doors.

BACKGROUND OF THE INVENTION

Light sport utility vehicles such as Jeeps® and the like, often comprise removable or convertible top assemblies. Many drivers prefer to disassemble or remove the top of the vehicle to give it an open or convertible-like feel. In addition to having removable tops, these vehicles often also have lightweight removable doors. The ease of removal of both the tops and the doors is often facilitated by their lightweight construction. Often both items are constructed of a fabric material stretched over and attached to a lightweight substantially rigid frame.

While the light tops and doors often help to maintain the contents of the vehicle, because of their lightweight construction, they offer little in the way of protection against anything other than elements such as rain. Drivers often ignore this risk, due to the fact that their very reason for owning such vehicles, is to enjoy their open feel.

Because of their sport utility nature, these vehicles are often capable of and utilized for activities such as trail-riding or rock-crawling. The goal of such activities is generally to cross vast amounts rugged terrain. During these rides, vehicles are regularly subjected to severe vibration in addition to changes in direction, pitch, and roll. Mainly, drivers rely on existing fabric doors to retain the contents of the vehicle and protect the occupants from debris or other hazards inherent to these activities.

Despite the lightweight construction, occupants can easily become overheated as these trail rides usually occur in hot and arid conditions. It is these conditions where the removal of the door is necessary to enhance the circulation of air through the vehicle. This practice has one major drawback as it exposes both drivers and passengers to the risks of losing belongings or injury from flying debris.

Because of the drawbacks of current removable door configurations, the foregoing suggests that improvements to removable vehicle doors are both desirable and possible.

BRIEF SUMMARY OF THE INVENTION

An open mesh vehicle door includes a substantially rigid frame member, having at least one means to pivotally affix said door to a vehicle at a first end. The door includes a conventional latch means at a second end. The first end of the door and the second end of the door are connected by at least one horizontal frame member. The door further includes an open mesh webbing that is attached between any two opposing sides of said frame member. The open mesh webbing can also be attached to the remaining sides of the substantially rigid doorframe.

The open mesh door can help to maintain the contents of the vehicle, provide the occupants protection from debris, and increase the air circulation throughout the cabin of the vehicle. Accordingly, it is an object of the present invention to provide a removable vehicle door.

It is a further object of the present invention to provide a removable open mesh vehicle door.

It is a still further object of the present invention to provide a removable open mesh vehicle door for a sport utility vehicle or the like.

Further objects and advantages of the present invention will become apparent by reference to the following detailed disclosure of the invention and appended drawings.

DETAILED DISCLOSURE OF THE INVENTION

Figure 1:
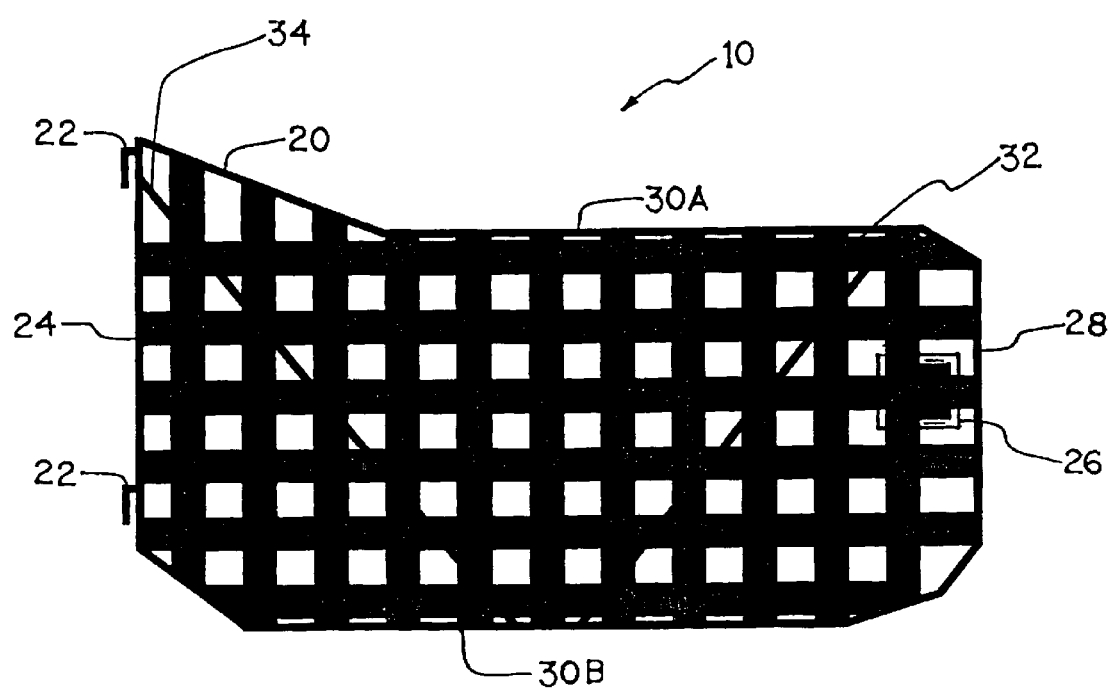
FIG. 1 is an illustration of a half size open mesh vehicle door according to the present invention.
Figure 2:
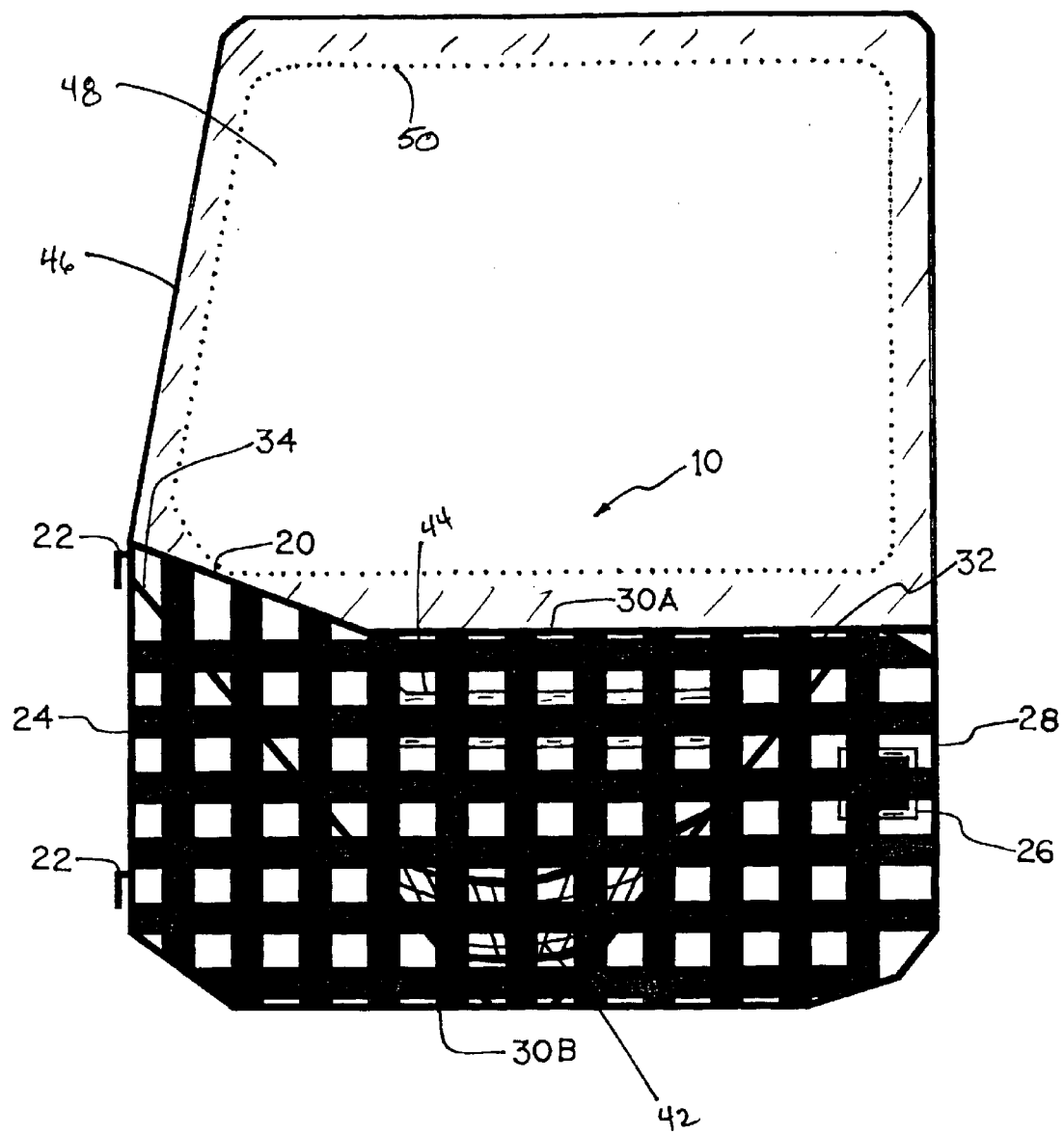
FIG. 2 is an illustration of a full size open mesh vehicle door according to the present invention.
Figure 3:
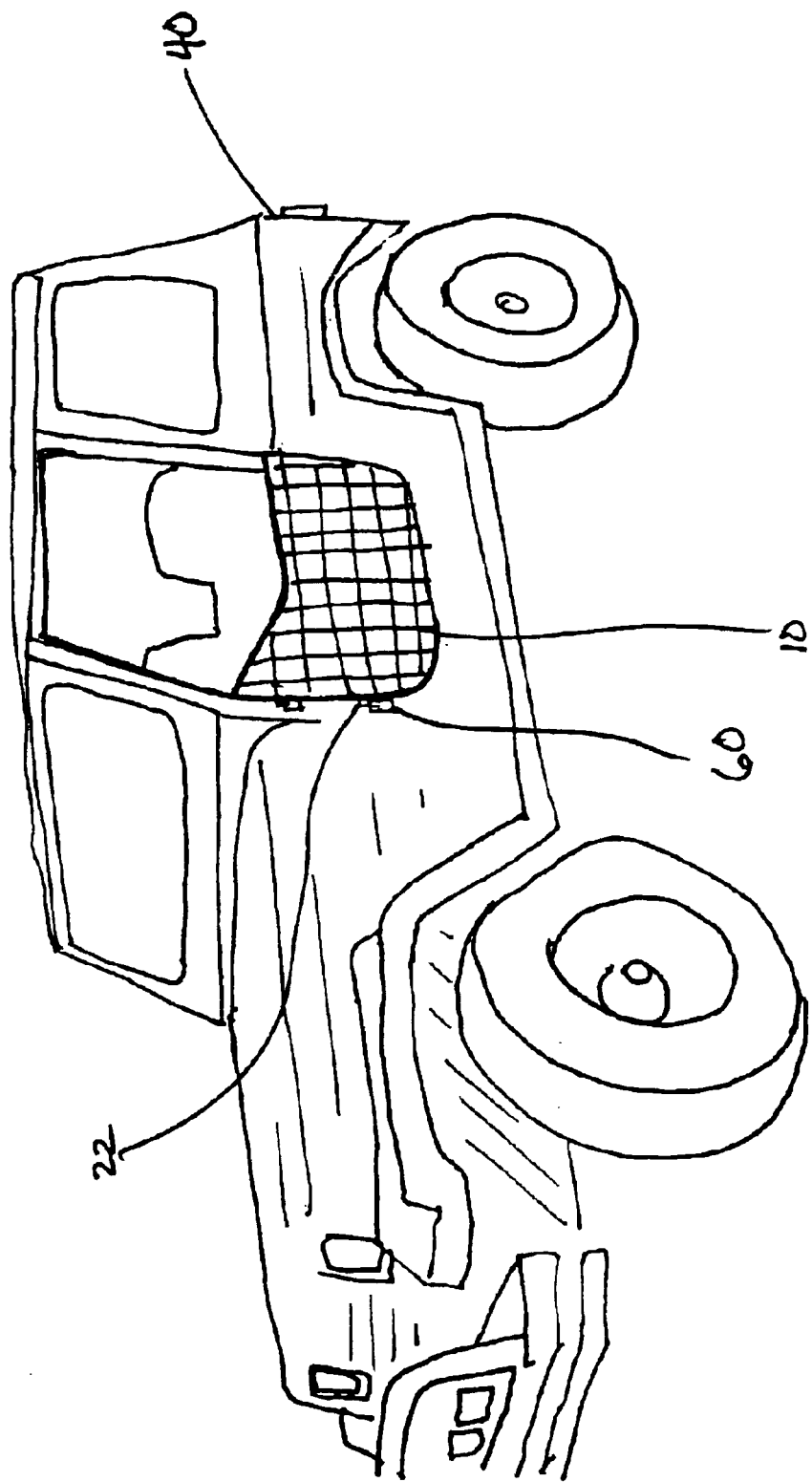
FIG. 3 is an illustration of an open mesh door according to the present invention in place on a vehicle.

Referring now to FIG. 1, an open mesh vehicle door according to the present invention is illustrated and generally designated by the reference numeral 10.

The open mesh vehicle door 10 includes a substantially rigid frame member 20, having at least one means 22 to pivotally affix said door 10 to a vehicle 40 at a first end 24. The door includes a conventional latch means 26 as is shown in the art at a second end 28. The first end 24 of the door and the second end 28 of the door are connected by at least one horizontal frame member 30A, 30B. The substantially rigid frame 20 conforms to the dimensions of the vehicle doorjamb 42, or a fraction thereof. For example, many sport utility vehicles 40 have half doors that conform to the lower half of the doorjamb. The door 10 further includes an open mesh webbing 32 that is attached between any two opposing sides of said frame member 20.

For purposes of this disclosure "open-mesh webbing" is defined as a webbing comprised of a solid material having open gaps or crossed strips of material connected together where the material intersects. The open section of the webbing generally comprises an area having a greatest dimension of less than two inches and a smallest dimension greater than one-quarter inch. In a preferred embodiment, the webbing 24 is between three-quarters of an inch and one and one-quarter inch wide. The open gaps between the webbing 24 are preferably substantially equal to the width of the material.

By way of example, the open mesh webbing can be attached to the two opposing vertical frame members 24 and 28 or it can be attached to two opposing horizontal frame members 30A and 30B. The open mesh webbing 32 can also be attached to all sides of the substantially rigid doorframe 20 for additional strength. To add additional strength to the door frame 20, support members 34 can be attached between any of the frame members 24, 28, 30A, 30B.

In a preferred embodiment, the pivotal attachment 22 comprises a gravity hinge further comprising a downward angled vertical pin 22 that is complimentarily received in a vertical cylinder 60 attached to the vehicle 40. The door 10 is then held in place by gravity. In an alternative embodiment, a conventional hinge mechanism may be used.

In another alternative embodiment, an additional frame member 46 or members are attached to the door 10 to accommodate a window 48 comprising a translucent material, screen or screen-like material in the upper half of the door. This provides additional protection from debris. The translucent material may comprise plastic, vinyl or any other material sufficient to function as a window. The window 48 can be attached to the door 10 by the use of a zipper 50 to facilitate its opening or removal.

In another embodiment, pockets (not shown) attached to the inner side of the door 10 to hold accessories such as maps, tools, and the like. In another embodiment, padded arm rests may be attached over the upper horizontal frame member 30A of a half door frame, or the central horizontal frame member of a full door frame, for increased comfort.

In a preferred embodiment, the open mesh 32 is constructed of strips of heavy-duty fabric, nylon, polypropylene, or similar material spaced and connected at regular intervals to form a grid or crisscross pattern. The strips can intersect at almost any angle, however, between 45 degrees and 90 degrees is preferred. The strips are of sufficient length to allow the ends to be attached to the frame 20. The intersections of the webbing are connected preferably by stitching to increase durability and to conjoin the individual strips of webbing into a single net-like open mesh 32. For example, sewing, heat bonding, chemical bonding or any other type of bonding that would maintain the integrity or the mesh can connect the strips. The loose ends of the mesh are then attached to the frame by either looping the webbing around the frame 20 or attaching the webbing to connections (not shown) included on the frame 20.

The mesh 32 can be permanently sewed to the frame 20, connected using removable snaps, or attached using other similar mechanical means of attachment. The mesh can be constructed using a variety of different materials in varying widths of webbing spaced at varying intervals and in any available color or combination of colors.

There are numerous benefits to open-mesh removable vehicle doors described in the instant application. Ventilation through the vehicle is increased and improved due to open spaces in the mesh covering allowing air movement through the door panel and circulating through the cabin. Existing doors utilizing solid panels of fabric or metal do not allow for this. The "open" feel of the vehicle (a desirable characteristic of the vehicle for Jeep®-type vehicle owners) is enhanced while maintaining roughly the same measure of safety and security of occupants as solid-fabric-panel doors. The open mesh vehicle doors can also provide a safer alternative to those drivers who prefer to operate their vehicles with the doors removed, allowing a much more open feel as compared to solid panel doors. Visibility is greatly increased compared to solid-panel doors which is especially important when pursuing off-road activities such as trail-riding or rock-crawling.

Inasmuch as the preceding disclosure presents the best mode devised by the inventor for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and scope of the following claims.

What is claimed is:

1. An open mesh vehicle door comprising a substantially rigid frame member further comprising at least one removable hinge member for pivotally affixing said frame to a vehicle and a latch means for securing said frame member; and an open mesh webbing fixedly attached between at least two opposing sides of said frame member.

2. The open mesh vehicle door of claim 1 wherein said door is a full door.

3. The open mesh vehicle door of claim 2 wherein said door further comprises a screen on the upper half of the door.

4. The open mesh vehicle door of claim 2 wherein said door further comprises at least one pocket on the inner portion of the door.

5. The open mesh vehicle door of claim 2 wherein said door further comprises an armrest on the inside of the door.

6. The open mesh vehicle door of claim 1 wherein said door is a half door.

7. The open mesh vehicle door of claim 6 wherein said door further comprises at least one pocket on the inner portion of the door.

8. The open mesh vehicle door of claim 6 wherein said door further comprises an armrest fixedly attached to the inner portion of the door.

9. The open mesh vehicle door of claim 1 wherein said webbing comprises juxtaposed strips of material connected at each intersection.

10. The open mesh vehicle door of claim 1 wherein said webbing comprises a solid piece of material having open areas.

11. The open mesh vehicle door of claim 1 wherein the method for connecting said material is selected from the group consisting of sewing, riveting, heat bonding, chemical bonding a installing snaps.

12. The open mesh vehicle door of claim 11 wherein said mesh is connected to said frame member by a method selected from the group consisting of, sewing, riveting, heat bonding, chemical bonding a installing snaps.

13. An open mesh vehicle door comprising a substantially rigid frame member further comprising a plurality of removable hinge members for pivotally affixing said frame to a vehicle at a first end of said frame member and a latch means for securing said frame member to a vehicle at a second end; and an open mesh webbing fixedly attached between at least two opposing sides of said frame member.

14. The open mesh vehicle door of claim 13 wherein said removable hinge is a gravity hinge.

15. The open mesh vehicle door of claim 13 wherein said door has an additional frame member for accommodating a window.

16. The open mesh vehicle door of claim 15 wherein said window comprises translucent material.

17. The open mesh vehicle door of claim 15 wherein said window comprises a screen.

18. An open mesh vehicle door comprising a substantially rigid frame member further comprising a plurality of removable gravity hinge members for pivotally affixing said frame to a vehicle at a first end of said frame member and a latch means for securing said frame member to a vehicle at a second end; at least one upper frame member for accommodating a window thereby creating a full door; and an open mesh webbing fixedly attached between at least two opposing sides of said frame member.

19. The open mesh vehicle door of claim 18 wherein said window comprises translucent material.

20. The open mesh vehicle door of claim 18 wherein said window comprises a screen.

21. The open mesh vehicle door of claim 1 wherein said webbing comprises a solid piece of material having open areas.

* * * * *